United States Patent Office 3,372,134
Patented Mar. 5, 1968

3,372,134
REINFORCED SYNTHETIC RUBBER LATEX AND USES
Robert M. Pierson, Hudson, and Richard W. Hobson, Mitchell S. Kolaczewski, and Thomas H. Rogers, Jr., Akron, Ohio, assignors to The Goodyear Tire & Rubber Company, Akron, Ohio, a corporation of Ohio
No Drawing. Filed June 1, 1964, Ser. No. 371,806
7 Claims. (Cl. 260—29.7)

This invention relates to the manufacture of a resin reinforced synthetic rubber latex and uses thereof as a film, for example, of the nature formed in the manufacture of foam rubber having improved modulus, improved stock efficiency, also referred to as an improvement in resistance to compression, improved tensile strength and improved low temperature flexibility.

It is well known that some products made from synthetic rubber latex show deficiencies in physical properties when compared to the physical properties possessed by natural rubber latex products; and attempts have been made over the years to make synthetic rubber latex products having properties equal, or superior to those possessed by products from natural rubber latex.

A particularly outstanding advantage in this respect was achieved when an improved process was developed for increasing the particle size and solids content of synthetic rubber latex without increasing the non-rubber hydrocarbon content of the latex, all as set forth in U.S. Patent 3,080,334.

The particle size of the synthetic rubber latex made in accordance with the process disclosed in the aforementioned patent is based on the use of an optimum amount of micelle producing surfactant sufficient, however, to promote the conversion of monomer to polymer at an acceptable rate up to 40% conversion and stabilize the resulting latex particles during the conversion period, but insufficient surfactant to prevent the surface tension of the latex system from increasing to a maximum value during polymerization and then decreasing to a minimum value during agglomeration which takes place after about 40% conversion. The agglomeration which is brought about through controlled agitation of the system adjusted to the variable soap coverage on the surface of the latex particles during polymerization has been found to be advantageous in developing a synthetic rubber latex having improved colloidal properties which lead to improved physical properties in products made therefrom such as foam rubber.

It has been discovered that the properties of foam rubber obtained from a latex made in an emulsion system under conditions which promote agglomeration of the particles during the polymerization period, particularly near the end of the period, may be further improved by incorporating into the polymerization system a high softening point resin as a latex during an optimum polymerization stage. Specifically, this improvement in the properties of foam rubber is obtained by the addition of a resinous latex to a polymerizing synthetic rubber emulsion system. Especially is improvement noted when the resin latex is added after at least 10% conversion of the monomers, and before substantial agglomeration of the synthetic rubber latex particles has taken place.

The extent to which the monomers have polymerized when the resinous latex particles are incorporated with the rubber latex particles is one of the important steps of this invention and the unexpected results of this discovery may be seen from a study of the following examples wherein physical blends are made of synthetic rubber and resin latices; wherein a resin latex is added at 0% conversion of the polymerizing synthetic rubber emulsion system; wherein the resin latex is added to the polymerizing synthetic rubber emulsion system after 20% conversion; and wherein the resin latex is added to the same system after 40% conversion.

In each instance the emulsion system for the production of the rubber latex involves the use of the following formula charged to a 5 gallon pressure reactor. The reactor having an inside diameter of 9¾ inches and being 15½ inches deep and equipped with 3 evenly spaced vertical baffles, each 1 inch wide and 12 inches long, spaced ½ inch from the side of the reactor; and equipped with agitators comprising one 6 inch diameter 3 blade marine propeller and one 6 inch diameter Brumagim impeller mounted 6 inches apart on a shaft. The Brumagim had 3 equally spaced 3 inch arms mounted with 1½ square blades. The marine propeller was mounted on the end of the shaft 3 inches from the bottom of the reactor and the Brumagim was 4 inches below the surface of the reaction mixture. The blades of the Brumagims were at 90 degrees to the direction of rotation of the arms. Agitation throughout the reaction was 425 r.p.m. The following formula was charged to the reactor.

EXAMPLE I

Preparation of agglomerated rubber latex

| Materials | Parts (Dry Weight) | Range |
|---|---|---|
| Water | 100 | 50–150. |
| Butadiene-1,3 | 70 | 50–100. |
| Styrene (Total monomers charged—13 lbs.). | 30 | 50–0. |
| Modifier (tertiary dodecyl mercaptan) | 0.1 | .01 to 2.0. |
| Tripotassium phosphate | 0.11 | .01 to 2.0. |
| Versene Fe-3 (Sodium salt of ethylenediamine tetra-acetic acid). | .01 | .0001 to .1. |
| Ferrous sulfate heptahydrate | 0.005 | .0001 to .1. |
| Sodium formaldehyde sulfoxylate | 0.037 | .001 to .1. |
| Diisopropyl benzene hydroperoxide (50%) | 0.045 | .001 to .1. |
| Sodium hydrosulfite | 0.02 | .001 to .1. |
| Potassium oleate | 2.83 | .5 to 3.5. |
| Temperature, °F | 60 | 40 to 85. |
| Conversion, percent | 60 | 40 to 70. |
| Solids, percent | About 35 | |

The reaction was started at the time the catalyst was added to the reactor and the conversion, pH and surface tension were measured at the intervals listed below:

TABLE 1

| Reaction Time (hours) | Conversion (percent) | pH | Surface Tension (dynes/cm.) |
|---|---|---|---|
| 2.25 | 12.3 | 9.6 | 46.5 |
| 3.15 | 21.0 | 9.8 | 54.6 |
| 4.50 | 30.3 | 9.7 | 60.0 |
| 5.75 | 37.5 | 9.7 | 54.6 |
| 6.58 | 41.2 | 9.6 | 51.5 |
| 7.58 | 43.9 | 9.6 | 46.3 |
| 9.00 | 45.8 | 9.9 | 42.1 |
| 10.00 | 48.5 | 10.0 | 36.2 |
| 14.00 | 53.0 | 9.9 | 33.6 |
| 17.00 | 55.5 | 9.8 | 33.7 |
| 26.00 | 60.3 | 10.1 | 32.7 |

At the end of the reaction time the latex was concentrated to a total solids content of 66.4 which had a Brookfield viscosity of 399 c.p.s., a final surface tension of 32.7 dynes per centimeter, and an estimated average particle diameter of 3,000 A.

An example of a resinous latex is polystyrene latex made in accordance with the emulsion system represented by the following formula:

EXAMPLE II

*Preparation of polystyrene latex*

| Materials | Parts (Dry Weight) | Range |
|---|---|---|
| Water | 180 | 100–300. |
| Sodium rosinate | 4.5 | 3.0 to 5.0. |
| Tripotassium phosphate | 0.11 | .01 to .5. |
| Potassium persulfate | 0.3 | 0.1 to 0.5. |
| Styrene | 100 | |
| Normal dodecyl mercaptan | .25 | .05 to .50. |
| Temperature, °F | 122 | 115 to 135. |
| Conversion, percent | 100 | |
| Agitation, r.p.m | ¹ 250 | 150 to 500. |
| Solids, percent | About 35 | 30–50. |

¹ Marine propeller.

The materials listed above are charged to a 5 gallon pressure reactor of the nature described in respect to the equipment used in Example I above and the reaction carried out to completion in accordance with the temperature conditions and agitation set forth in the formulation above. Although linear polystyrene resin is prepared, a cross-linked resin may be prepared using any of the well known cross-linking agents including divinyl benzene and ethylene glycol dimethacrylate. Although sodium rosinate is used as the preferred emulsifying agent any of the well known emulsifying agents, as set forth hereinafter may be used.

EXAMPLE III

*Physical blend of latices of Examples I and II*

10 parts (dry weight) of the resinous latex of Example II are added to 90 parts (dry weight) of the rubber latex of Example I and compounded in accordance with the following formula:

| Materials | Parts (Dry Weight) | Range |
|---|---|---|
| 90/10 Rubber latex/polystyrene latex blend | 100 | |
| Sulfur (Curing agent) | 2.0 | 1.0 to 3.5. |
| Ethyl Zimate (Accelerator of Cure) | 0.5 | 0.1 to 1.0. |
| Zinc Captax (Zinc mercaptobenzothiazole) (Accelerator of Cure). | 1.5 | .5 to 2.0. |
| Wingstay "S" (Mixture of alkylated phenols or styrenated phenols). | 1.0 | 0.1 to 2.0. |

Each of the above identified compounding ingredients is added to the blend of latices as a dispersion and thoroughly blended therewith and the blend allowed to mature for two hours at 80° F.

The matured blend of latices is then frothed in the conventional manner using a conventional beater causing air to be trapped in the latex and thereby forming the desired foam to which are added the following ingredients:

| Materials | Parts (Dry Wgt.) | Range |
|---|---|---|
| Diphenyl guanidine | 0.6 | .1 to 1.0. |
| Zinc oxide (Activator of Cure) | 3.0 | 1.0 to 5.0. |
| Sodium silicofluoride (Gellant) | 2.5 | 1.0 to 5.0. |

The resulting foamed rubber latex is then poured into a mold cavity of conventional construction which is closed by lowering the lug containing cover, thereby causing the enclosed foamed latex to conform to the shape of the mold cavity with excess foamed latex leaving the cavity through an overflow vent. The molded latex foam is gelled within 2½ minutes from the time the foamed latex had been placed in the mold. The gelled foam rubber is vulcanized in an open-steam autoclave at 210° F. for 15 minutes and then air-oven dried for two hours at 250° F. The measured properties—stock efficiency, tensile strength, low temperature flexibility, and foam processing characteristics—are set forth below in Table 2.

EXAMPLE IV

*Resin latex added at 0% conversion*

10 parts (dry weight) of the resinous latex made in accordance with Example II is added (per 100 parts monomers) to the reaction for the manufacture of rubber latex as set forth above in Example I at 0% conversion; i.e., in the initial charge of materials in Example I. A homogeneous and intimate blend of rubber/resin latices is produced. This blend of latices is converted into foam rubber in the manner set forth above in Example III and the physical properties of this latex foam rubber are set forth in Table 2 below.

EXAMPLE V

*Resin latex added at 20% conversion*

The emulsion system for making synthetic rubber latex as set forth above in Example I is used here and modified to the extent that after the butadiene and styrene monomers had been polymerized to 20% conversion, 10 parts (dry weight) of the polystyrene resinous latex prepared in accordance with the process set forth in Example II above is added (per 100 parts monomers). The polymerization in the presence of the resinous latex is continued in accordance with the procedure set forth in Example I above and the resulting rubber/resin latex is converted to foam rubber and the physical properties thereof tested. The results of these tests are set forth in Table 2 below.

EXAMPLE VI

*Resin latex added at 40% conversion*

The procedure set forth in Example IV above is repeated here with the exception that the resin latex is added at 40% conversion. The resulting rubber/resin latex system is converted to foam rubber and the physical properties thereof are as indicated in Table 2 below.

TABLE 2.—PROPERTIES OF FOAM MADE FROM LATICES OF EXAMPLES III THROUGH VI

| | III | IV | V | VI |
|---|---|---|---|---|
| 1. Stock Efficiency (a), percent | +9.6 | +2.2 | +10.7 | +10.8 |
| 2. Tensile Strength (b), p.s.i | 9.3 | 8.8 | 10.9 | 12.1 |
| 3. Low Temperature Flexibility (c), percent | 86.0 | 91.2 | 92.6 | 91.7 |
| 4. Foam Processing (d) | Good | Poor | Good | Good |

(a) Stock efficiency (i.e. compression resistance) is a measure of the relative load carrying capacity of two different latex foam rubbers, one of which is a standard. A stock efficiency of −10% indicates that 10% greater weight of latex foam rubber material is needed to develop the same resistance to compression as is developed by the standard. A stock efficiency of +10% indicates that 10% less weight of latex foam rubber material is needed to develop the same resistance to compression as is developed by the standard.

(b) A.S.T.M. D412–51T.

(c) Measured at −20° F. and compared with 100% flexibility at room temperature.

(d) (1) Good—Finished foam rubber contains no defects such as blows, loose skin, etc.

(2) Fair—Finished foam rubber contains no defects only because of correction made during processing such as chemical and mechanical treatment.

(3) Poor—Finished foam rubber contains defects which could not be corrected by processing techniques.

Although synthetic rubber latex has many uses, one of its primary uses is in the manufacture of synthetic foam rubber and it is important that the synthetic rubber latex used imparts many desirable physical properties to the foam rubber including particularly those listed above. In an attempt to improve the stock efficiency, tensile strength, low temperature flexibility of the foam rubber and foam processing characteristics of the latex, it was found that when the synthetic rubber latex was compounded by physically blending polystyrene latices therewith, as was done in Example III, the low temperature flexibility properties were inferior; and when the resinous latex was added at 0% conversion to the synthetic rubber emulsion system used in making the rubber latex, as was done in Example IV, the low temperature flexibility improved at the expense of stock efficiency. In addition, the latex has poor foam processing characteristics which limited or restricted its use for commercial consideration. Since both the physical blend system (Example III) as well as the system used in Example IV above produced inferior properties in the resulting foam rubber, a person skilled in this art would gain little advantage in physical properties by pursuing this approach of modifying the synthetic rubber latices. However, Examples V and VI above show most unexpectedly that when the resinous latex is added to the emulsion polymerization system used in making synthetic rubber latex after the system has progressed to a conversion of at least 10% conversion and up to about 40% conversion, all four characteristics are improved as shown in Table 2 above for these examples.

Although the present invention has been described, particularly in reference to the use of butadiene and styrene in making synthetic rubber latex and the use of styrene in making the resinous latex, other polymerizable monomers may be used. For example the monomeric materials that may be used in preparing the synthetic rubber latex comprises unsaturated organic compounds. Monomers that may be used in making the rubbers are the conjugated dienes such as butadiene (1,3-butadiene), 2,3-dimethyl-1,3-butadiene, isoprene, piperylene, 2-furyl-1,3-butadiene, 2-methoxy-1,3-butadiene and the like; haloprenes, such as chloroprene, (2-chloro-1,3-butadiene), bromoprene, methyl chloroprene (2-chloromethyl-1,3-butadiene), and the like, aryl olefins such as styrene, various alkyl styrenes, p-chlorostyrene, p-methoxystyrene, alpha-methylstyrene, vinylnaphthalene and similar derivatives thereof, and the like, acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methylacrylamide and the like, methyl isopropenyl ketone, methyl vinyl ketone, methyl vinyl ether, vinylethynyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the type described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diene with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber, although, as can be readily deduced from the foregoing, there is a host of possible reactants, the most readily and commercially available monomers at present at butadiene (1,3-butadiene) and styrene. With these specific monomers, it is usually preferred to use them together, in relative ratios of butadiene to styrene between 45:55 and 95:5 parts by weight.

Emulsifying agents which are applicable in these polymerization processes are those agents which form micelles in aqueous media. Many such emulsifying agents are found in the art. Among the emulsifying agents which form micelles and are therefore applicable in the process of our invention are the alkali metal and ammonium salts of fatty acids such as sodium oleate, sodium stearate, sodium laurate, sodium myristate, sodium palmitate, the corresponding potassium salts and the like ammonium salts; the ammonium and alkali metal salts of rosin acids such as the ammonium, sodium and potassium salts of abietic acid, dehydroabietic acid, dihydroabietic acid and tetrahydroabietic acid; and such other materials as the alkyl and alkaryl sulfonates and the like. The controlling factor is that the emulsifying agent must form micelles.

As has hereinbefore been stated, emulsifying agents capable of forming micelles are well known and the use of such agents is well known in the art. As in any application of emulsifying agents, the emulsifying agents to be used in this invention should not be an inhibitor of polymerization nor should it have any other deleterious effects either on the process or on the product.

We prefer the alkali metal salts of fatty acids either alone or in admixture with alkali metal salts of rosin acids as our emulsifying agents. Such agents readily form micelles and provide ideal loci for polymer initiation.

In carrying out polymerization reactions, it is desirable to use a polymerization modifying agent. Preferred polymerization modifiers are alkyl mercaptans, and there may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. In the case of tertiary mercaptans, such as tertiary $C_{12}$ mercaptans, blends of tertiary $C_{12}$, $C_{14}$ and $C_{16}$ mercaptan, and the like, satisfactory modification is obtained with 0.05 to 3.0 parts mercaptan per 100 parts monomer, but smaller or larger amounts can be employed.

The polymerization of these components may be conducted batch-wise or continuously. The polymerization conditions are conventional in all respects with the exception that the emulsion system contains certain components within certain narrow limits and the agitation of the system is controlled in such a manner as to bring about the desired latex particle sizes. Thus, the polymerization of the monomers used in making a synthetic rubbery polymer latex is conducted in the presence of the materials listed above which are all used for reasons well known in producing synthetic rubbers and latices. Under conventional procedures using large amounts of water and soap, the polymerization may take about 10 to 45 hours to produce a conversion of at least 70% and as high as 95% of monomer to polymer but, in the present invention where less than 3 parts of surfactant is used and the conversion is carried to as high a level as possible consistent with the ability of the particles to be advantageously agglomerated, it is desirable that the conversion be in the order of about 40% to 65% and be achieved at a rate of at least 2% per hour. The system approaches the critical soap to surface ratio and the surface tension increases to a maximum value at which time the latex particles are ready to agglomerate. When agglomeration occurs the surface tension decreases directly in proportion to the degree of agglomeration occurring. Under the conditions of the present invention agglomeration proceeds to a high degree as evidenced by the low surface tension of the final latex. It has been observed that agitation affects the conversion at which agglomeration occurs, and considerable shifting of the agglomeration point can be accomplished by changing agitation speed during the reaction.

In making foam rubber from the rubber/resin latices made in the manner set forth above in Examples V and VI the synthetic rubber latex is compounded with the usual vulcanizing and compounding ingredients added in the conventional manner as aqueous solutions, slurries, or paste, just prior to the time the latex is to be foamed by beating with air or chemically with hydrogen peroxide, or the like. Other compounding ingredients include gellants and particularly of the delayed action type such as the alkali silicofluorides which may be added to the foam just prior to introduction of the foam latex into a mold. Gelling is then effected by permitting the sodium silicofluoride to hydrolyze and decrease the pH of the system in the well known manner.

In addition to the compounding ingredients mentioned above the synthetic rubber latex to be foamed after being stabilized with conventional stabilizing agents may be compounded with thickening agents such as casein, gum tragacanth, or water glass; conventional antioxidants, including phenyl beta naphthylamine; conventional accelerators, including the zinc salt of mercaptobenzothiazole; conventional lubricants, including castor oil; loading agents, including carbon black, magnesium oxide and calcium silicates and other conventional compounding ingredients.

Any resinous latex which is colloidally compatible with the synthetic rubber latex being blended therewith may be used in this invention; however, it is important that the latex be resinous in nature, particularly of the nature possessed by polystyrene as an example of a resinous type of latex and modifications thereof down to and including copolymers of 80 parts of styrene and 20 parts of a diene such as butadiene-1,3. It is observed that when the resinous nature of the reinforcing latex approaches the nature possessed by a 50/50 copolymer of styrene/butadiene, the stock efficiency of the foam rubber made therefrom is decreased; i.e., in the range of about $+1\%$ to $+2\%$ instead of in the range of about $+10\%$. The resinous nature of the latex may be fortified by carrying out the polymerization in the presence of a cross-linking agent such as divinyl benzene present in an amount from about 0.5 part to 10 parts per 100 parts of monomer being reacted.

The following properties characterize the rubber/resin latices made in accordance with the process of this invention and exemplified in Examples V and VI above.

| Characteristics | Range | Preferred |
| --- | --- | --- |
| Total Solids Content | 65–75 | 70 |
| pH | 9–11 | 10 |
| Surface Tension (dynes/cm.) | 29–45 | 32 |
| Bound Styrene (Apparent percent) | 30–35 | 32 |
| Conversion (Of rubber latex percent) | 45–65 | 60 |
| Mooney (Plasticity of Polymer) (M/L–4) | 70–150 | 150 |

The discovery of adding a reinforcing resin latex to a polymerization system only after it has progressed to a conversion of monomer to polymer of about 10% to improve the physical properties of the resulting reinforced resin rubber latex in regard to stock efficiency when used in making foam, tensile strength of a film cast therefrom, low temperature flexibility of a foam made therefrom and the processability of the latex in making foam over a simple blending of the individual latices appears to be explainable on the basis that the reinforcing resin is occluded within the basic latex particles in a manner which is otherwise not obtainable and therefore not productive of the results discovered here when the reinforcing resin is added either at 0% conversion or when used as a simple blend. The amount of reinforcing resin that may be added may range from about 5 parts to about 25 parts on initial monomers with the maximum improvements being observed when about 10 to 15 parts are used. The apparent bound styrene, when polystyrene reinforcing latex is added to a GRS type of rubber latex, ranges from about 25% to about 35% and is preferred to range from about 29% to 33%.

When the reinforcing resinous latex is added to the polymerization system used in making the synthetic rubber latex at a conversion of about below 10%, little, or if any, improvement is observed in the physical properties identified above. On the other hand the resinous reinforcing latex must be added prior to the start of substantial agglomeration of the rubber latex particles which is generally prior to a conversion of about 45%.

The stock efficiency of foam rubber made from the resin reinforced rubber latex of this invention may be further improved by the addition of more resinous latex made in accordance with Example II above as a mixture. The resinous latex may be added in amounts from about 5 to about 25 parts per 100 parts of the resin reinforced rubber latex made in accordance with Examples 5 and 6 above. When 10 parts of polystyrene latex made in accordance with Example II is added as a blend to the resin reinforced rubber latex made in accordance with Example III above, the stock efficiency increases from about 10% to about 25%. The tensile strength is about 8 p.s.i., the low temperature flexibility is about 82% and the foam processing is good.

While certain representative embodiments and details have been shown for the purpose of illustrating the invention, it will be apparent to those skilled in this art that various changes and modifications may be made therein without departing from the spirit or scope of the invention.

What is claimed is:

1. In the process of preparing a synthetic rubbery polymeric latex by polymerizing a polymerizable conjugated diene monomer while dispersed in an aqueous emulsion system containing a micelle producing surfactant, and a free radical initiator, at a polymerization temperature of from about 40° F. to about 85° F. and forming a rubbery latex particle in which the monomer is soluble, in which sufficient surfactant is present in the water to form micelles to promote the conversion of monomer to polymer during at least up to 40% conversion of monomer to polymer and stabilize the resulting latex particles during said conversion period, but insufficient to prevent the surface tension of the system from increasing to a maximum value during polymerization and then decreasing to a minimum value during agglomeration when at least 45% of monomer has been converted to polymer, the improvement which comprises adding a resinous latex selected from the group consisting of polystyrene and copolymers of styrene and a conjugated diene hydrocarbon to the system after the system has undergone a 10% conversion and before about a 40% conversion of monomer to polymer, continuing polymerization of the monomer to a conversion of from about 45% to about 70% and then treating the latex particles with agitation to cause agglomeration of the latex particles and a decrease of the surface tension and recovering the latex.

2. The process of claim 1 wherein the resinous latex added is polystyrene resin latex.

3. The process of claim 1 wherein from 5 to 25 parts of resinous latex per 100 parts of monomers is added.

4. The process of claim 1 wherein the resinous latex added is a copolymer of from 65 to 95 parts of styrene and from 35 to 5 parts of diene.

5. The process of claim 1 wherein the resinous latex added is a copolymer of 85 parts of styrene and 15 parts of butadiene-1,3.

6. The process of claim 2 wherein the polystyrene latex is added at about 15% conversion.

7. The process of claim 5 wherein the resinous latex is added at about 25% conversion.

References Cited

UNITED STATES PATENTS

| | | | |
| --- | --- | --- | --- |
| 2,614,093 | 10/1952 | Wheelock | 260—29.7 |
| 3,107,224 | 10/1963 | Rogers et al. | 260—2.5 |
| 3,238,172 | 3/1966 | Talalay et al. | 260—2.5 |

MURRAY TILLMAN, *Primary Examiner.*

SAMUEL BLECH, GEORGE F. LESMES,
*Examiners.*

M. FOELAK, *Assistant Examiner.*